(12) United States Patent  
Caiozza

(10) Patent No.: US 7,780,849 B2  
(45) Date of Patent: Aug. 24, 2010

(54) MAGNETICALLY ENHANCED OIL FILTER APPARATUS

(76) Inventor: Joseph C. Caiozza, 321 W. Market St., Long Beach, NY (US) 11561

( * ) Notice: Subject to any disclaimer, the term of this patent is extended or adjusted under 35 U.S.C. 154(b) by 426 days.

(21) Appl. No.: 11/545,007

(22) Filed: Oct. 10, 2006

(65) Prior Publication Data

US 2008/0083668 A1    Apr. 10, 2008

(51) Int. Cl.  
*B01D 35/06* (2006.01)

(52) U.S. Cl. .................. 210/223; 210/440; 184/6.25

(58) Field of Classification Search ............ 210/223, 210/295, 443, 444, DIG. 17, 440; 184/6.25; 335/306  
See application file for complete search history.

(56) References Cited

U.S. PATENT DOCUMENTS 5,462,662 A * 10/1995 Chen ................ 210/223

6,649,053 B2 * 11/2003 Caiozza ................ 210/223

* cited by examiner

*Primary Examiner*—David A Reifsnyder

(57) ABSTRACT

A magnetically enhanced oil filter apparatus includes an oil filtration assembly which includes a filtration assembly base having oil inlets and an oil outlet located in the filtration assembly base. A filtration material support bracket rests on the filtration assembly base. A quantity of filtration material is supported by the filtration material support bracket. A flow director shroud is connected to the filtration material support bracket. A top portion of the flow director shroud extends over the filtration material. A retainer spring urges the filtration material support bracket in firm contact with the filtration assembly base. A magnetic flux assembly rests on the oil filtration assembly, and assembly-to-assembly connection means are provided for connecting the magnetic flux assembly to the oil filtration assembly. The apparatus of the invention permits ferromagnetic particles to be removed from oil prior to being filtered through a quantity of filtration material.

14 Claims, 5 Drawing Sheets

MAGNETICALLY ENHANCED OIL FILTER APPARATUS

BACKGROUND OF THE INVENTION

1. Field of the Invention

The present invention relates generally to oil filter devices and, more particularly, to oil filter devices having a filtering action that is magnetically enhanced.

2. Description of the Prior Art

The use of a magnet array to enhance the filtering properties of oil filter devices is well known in the art. In this respect, throughout the years, a number of innovations have been developed by the present inventor herein relating to magnetically enhanced oil filter devices, and the following U.S. patents are representative of some of those innovations: U.S. Pat. Nos. 6,426,000, 6,649,053, and 6,758,969.

More specifically, each of U.S. Pat. Nos. 6,426,000 and 6,649,053 discloses a magnet array which employs top and bottom horizontally oriented shunt magnets and top and bottom shunt members in contact with the top and bottom horizontally oriented shunt magnets. To reduce the need for horizontally oriented shunt magnets, it would be desirable if a magnet array did not need both top and bottom shunt magnets.

Furthermore, since the bottom portion of a magnet array is in closer proximity to the oil being filtered than the top portion of the magnet array, and since it would be desirable to reduce the number of horizontally oriented shunt magnets, it would be desirable if the top portion of the magnet array, the portion farthest from the oil being filtered, does not employ a horizontally oriented shunt magnet.

U.S. Pat. No. 6,758,969 discloses a magnetically enhanced oil filter apparatus in which internal walls direct oil flow toward a magnet array located on the top of the apparatus. In addition, the oil filter material occupies space that is closely adjacent to the magnet array. As a consequence, some of the oil filter material obstructs the flow of oil to some portions of the apparatus which are adjacent to the magnet array. In this way, the efficiency of the magnet array is impeded. In this respect, it would be desirable if a magnetically enhanced oil filter apparatus were provided which does not have oil filter material obstructing the flow of oil to some portions of the apparatus which are adjacent to the magnet array.

Another feature of U.S. Pat. No. 6,758,969 is the apparent lack of an internal pressure relief valve that would relieve an excessive build up of oil pressure if the oil filter material becomes excessively clogged. In this respect, it would be desirable if a magnetically enhanced oil filter apparatus were provided which accommodates the presence of an internal pressure relief valve to relieve excessive internal oil pressure.

Thus, while the foregoing body of prior art indicates it to be well known to use magnetic enhancement of oil filtering, the prior art described above does not teach or suggest a magnetically enhanced oil filter apparatus which has the following combination of desirable features: (1) provides a magnet array that does not need both top and bottom shunt magnets; (2) has a top portion of the magnet array, the portion farthest from the oil being filtered, that does not employ a horizontally oriented shunt magnet; (3) does not have oil filter material obstructing the flow of oil to some portions of the apparatus which are adjacent to the magnet array; and (4) accommodates the presence of an internal pressure relief valve to relieve excessive internal oil pressure. The foregoing desired characteristics are provided by the unique magnetically enhanced oil filter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a magnetically enhanced oil filter apparatus which includes an oil filtration assembly which includes a filtration assembly base having oil inlets and an oil outlet located in the filtration assembly base. An exterior housing is connected to the filtration assembly base. The exterior housing and the filtration assembly base define a pre-filtration zone. A filtration material support bracket rests on the filtration assembly base. The filtration assembly base and the filtration material support bracket define a post-filtration zone. A quantity of filtration material is supported by the filtration material support bracket and located in the pre-filtration zone. A flow director shroud is connected to the filtration material support bracket and is located in the pre-filtration zone. A top portion of the flow director shroud extends over the filtration material, and a retainer spring, positioned between the exterior housing and a top portion of the filtration material support bracket, is provided for urging the filtration material support bracket in firm contact with the filtration assembly base.

The magnetically enhanced oil filter apparatus permits ferromagnetic particles from being removed from oil prior to being filtered through a quantity of filtration material.

A magnetic flux assembly rests on the oil filtration assembly, and assembly-to-assembly connection means are provided for connecting the magnetic flux assembly to the oil filtration assembly.

The filtration material support bracket and the flow director shroud can be formed as a unified, integrated structure. In addition, a flexible, oil resistant sealing ring is connected to a bottom side of the filtration assembly base.

A blowby valve assembly is connected to the filtration material support bracket for controlling oil flow between the pre-filtration zone and the post-filtration zone.

The retainer spring can be in a form of a spiral retainer spring. Alternatively, the retainer spring can be in a form of a spring which has an inner ring portion and has radially directed leaf spring arms extending outward from the ring portion.

The top portion of the flow director shroud forms a flow director orifice. The flow director orifice has a flow director orifice first diameter which is greater than an external diameter of the retainer spring.

The flow director orifice has a flow director orifice second diameter which is less than the internal diameter of the retainer spring.

Preferably, the magnetic flux assembly includes a pair of bottom magnet units, wherein each bottom magnet unit includes a plurality of vertically oriented, flux providing magnets and includes a bottom shunt member which supports the vertically oriented, flux providing magnets. A plurality of horizontally oriented bottom shunt magnets are interconnected between the bottom shunt members of the pair of bottom magnet units, and a dome-shaped top shunt member is placed on top of the vertically oriented, flux providing magnets.

The assembly-to-assembly connection means can include a pin reception channel in the dome-shaped top shunt member. Brace brackets are on the exterior housing, and brace members are interlocked with the brace brackets and extend upward toward the dome-shaped top shunt member. A lock pin is threaded through pin reception channels in the brace members and through the pin reception channel in the dome-shaped top shunt member.

In accordance with another aspect of the invention, an oil filtration assembly includes a filtration assembly base having oil inlets and an oil outlet located in the filtration assembly base. An exterior housing is connected to the filtration assembly base. The exterior housing and the filtration assembly base define a pre-filtration zone. A filtration material support bracket rests on the filtration assembly base. The filtration assembly base and the filtration material support bracket define a post-filtration zone. A quantity of filtration material is supported by the filtration material support bracket and is located in the pre-filtration zone. A flow director shroud is connected to the filtration material support bracket and is located in the pre-filtration zone, wherein a top portion of the flow director shroud extends over the filtration material. A retainer spring is positioned between the exterior housing and a top portion of the filtration material support bracket, for urging the filtration material support bracket in firm contact with the filtration assembly base.

In accordance with another aspect of the invention, a magnetic flux assembly includes a pair of bottom magnet units, wherein each bottom magnet unit includes a plurality of vertically oriented flux providing magnets and a bottom shunt member which supports the vertically oriented flux providing magnets. A plurality of horizontally oriented bottom shunt magnets are interconnected between the bottom shunt members of the pair of bottom magnet units, and a dome-shaped top shunt member placed on top of the vertically oriented flux providing magnets.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetically enhanced oil filter apparatus which has all of the advantages of the prior art and none of the disadvantages.

It is another object of the present invention to provide a new and improved magnetically enhanced oil filter apparatus which may be easily and efficiently manufactured and marketed.

It is a further object of the present invention to provide a new and improved magnetically enhanced oil filter apparatus which is of durable and reliable construction.

An even further object of the present invention is to provide a new and improved magnetically enhanced oil filter apparatus which is susceptible of a low cost of manufacture with regard to both materials and labor, and which accordingly is then susceptible of low prices of sale to the consuming public, thereby making such magnetically enhanced oil filter apparatus available to the buying public.

Still yet a further object of the present invention is to provide a new and improved magnetically enhanced oil filter apparatus which provides a magnet array that does not need both top and bottom shunt magnets.

Still another object of the present invention is to provide a new and improved magnetically enhanced oil filter apparatus that has a top portion of the magnet array, the portion farthest from the oil being filtered, that does not employ a horizontally oriented shunt magnet.

Yet another object of the present invention is to provide a new and improved magnetically enhanced oil filter apparatus which does not have oil filter material obstructing the flow of oil to some portions of the apparatus which are adjacent to the magnet array.

Even another object of the present invention is to provide a new and improved magnetically enhanced oil filter apparatus that accommodates the presence of an internal pressure relief valve to relieve excessive internal oil pressure.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
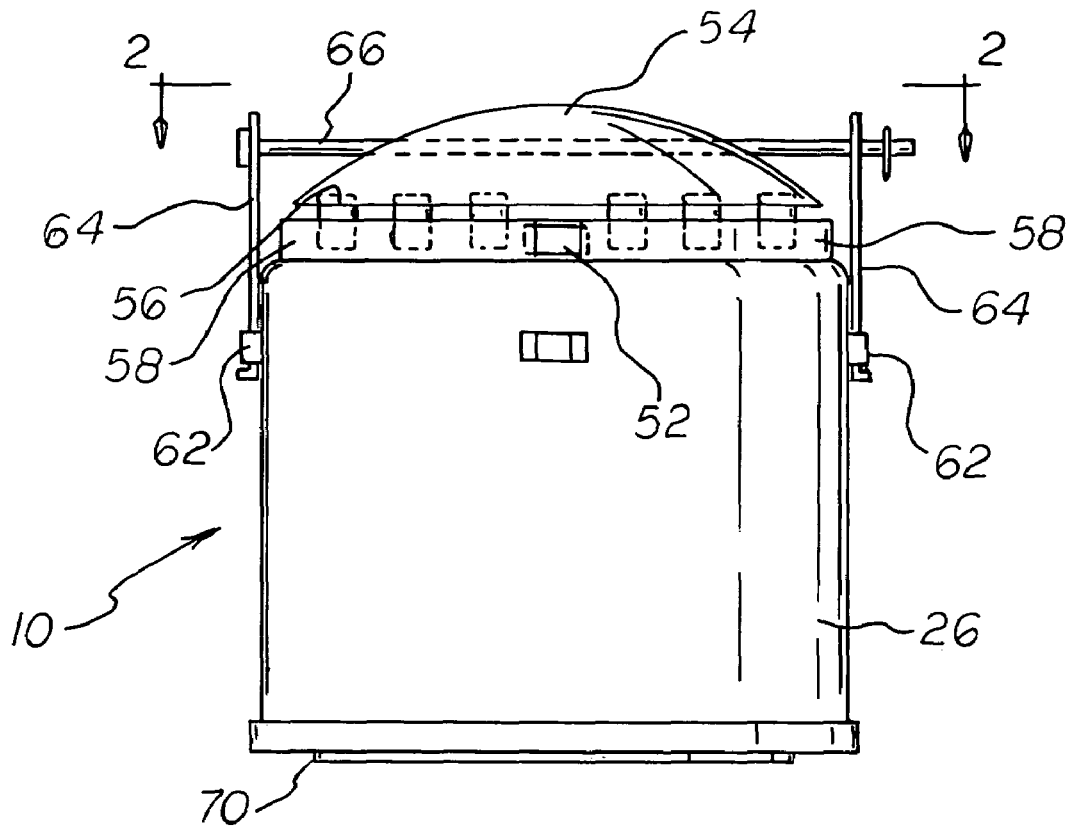
FIG. 1 is a side view showing a fully assembled first embodiment of the magnetically enhanced oil filter apparatus of the invention.
Figure 2:
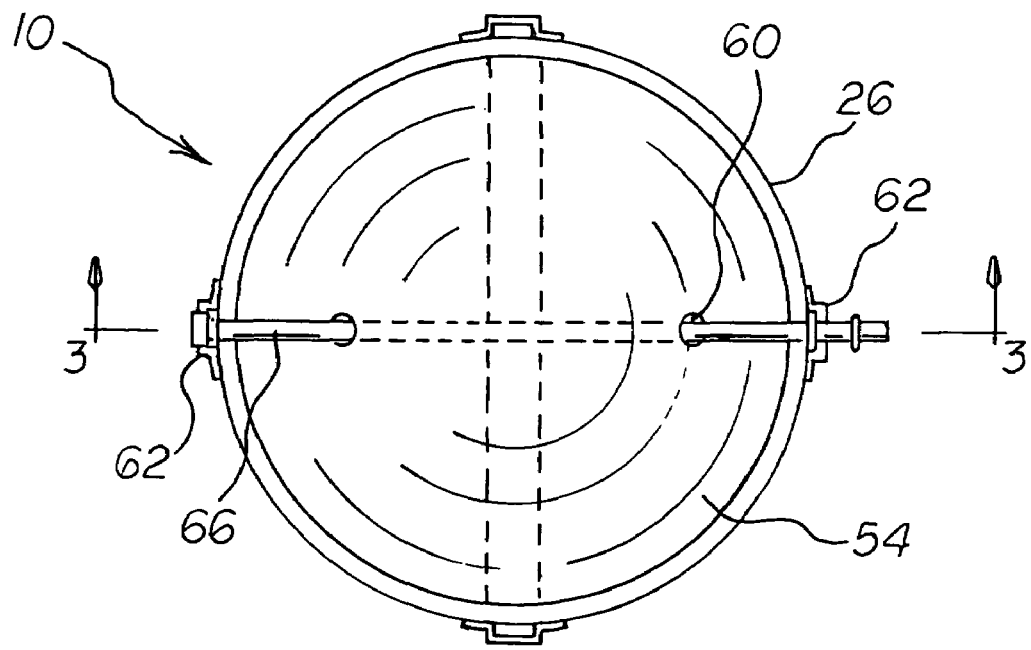
FIG. 2 is a top view of the embodiment of the magnetically enhanced oil filter apparatus shown in FIG. 1 taken along line 2-2 of FIG. 1.

With reference to the drawings, a new and improved magnetically enhanced oil filter apparatus embodying the principles and concepts of the present invention will be described.

Turning to FIGS. 1-5, there is shown a first embodiment of the magnetically enhanced oil filter apparatus of the invention generally designated by reference numeral 10. In each of the figures, reference numerals are shown that correspond to like reference numerals that designate like elements shown in other figures.

In the first embodiment, magnetically enhanced oil filter apparatus 10 includes an oil filtration assembly which includes a filtration assembly base 12 having oil inlets 14 and an oil outlet 16 located in the filtration assembly base 12. An exterior housing 26 is connected to the filtration assembly base 12. The exterior housing 26 and the filtration assembly base 12 define a pre-filtration zone 28. A filtration material support bracket 18 rests on the filtration assembly base 12. The filtration assembly base 12 and the filtration material support bracket 18 define a post-filtration zone 30. A quantity of filtration material 20 is supported by the filtration material support bracket 18 and located in the pre-filtration zone 28. A flow director shroud 22 is connected to the filtration material support bracket 18 and is located in the pre-filtration zone 28. A top portion 24 of the flow director shroud 22 extends over the filtration material 20, and a retainer spring, positioned between the exterior housing 26 and a top portion of the filtration material support bracket 18, is provided for urging the filtration material support bracket 18 in firm contact with the filtration assembly base 12.

A magnetic flux assembly rests on the oil filtration assembly, and assembly-to-assembly connection means are provided for connecting the magnetic flux assembly to the oil filtration assembly.

The filtration material support bracket 18 and the flow director shroud 22 can be formed as a unified, integrated structure. In addition, a flexible, oil resistant sealing ring 70 is connected to a bottom side of the filtration assembly base 12.

A blowby valve assembly 32 is connected to the filtration material support bracket 18 for controlling oil flow between the pre-filtration zone 28 and the post-filtration zone 30.

As shown with the first embodiment of the invention, the retainer spring is in a form of a spiral retainer spring 34.

Figure 6:
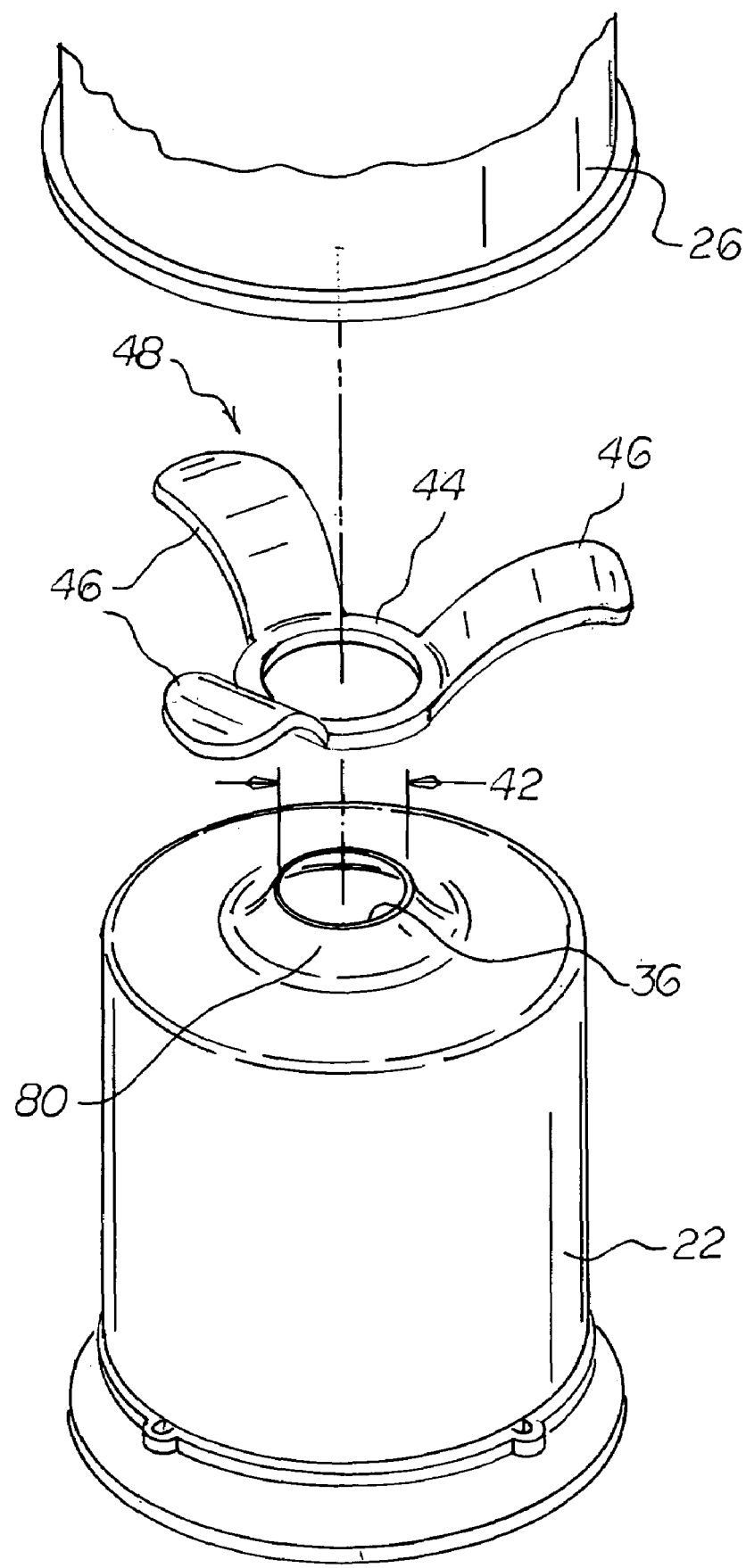
FIG. 6 is a partially exploded perspective view of a second embodiment of the invention wherein an exterior housing is shown with respect to a flow director shroud and a spring having radially directed leaf spring arms located between the exterior housing and the flow director shroud.

As shown with the second embodiment of the invention, in FIG. 6, the retainer spring is in a form of a spring 48 which has an inner ring portion 44 and has radially directed leaf spring arms 46 extending outward from the ring portion 44.

Figure 3:
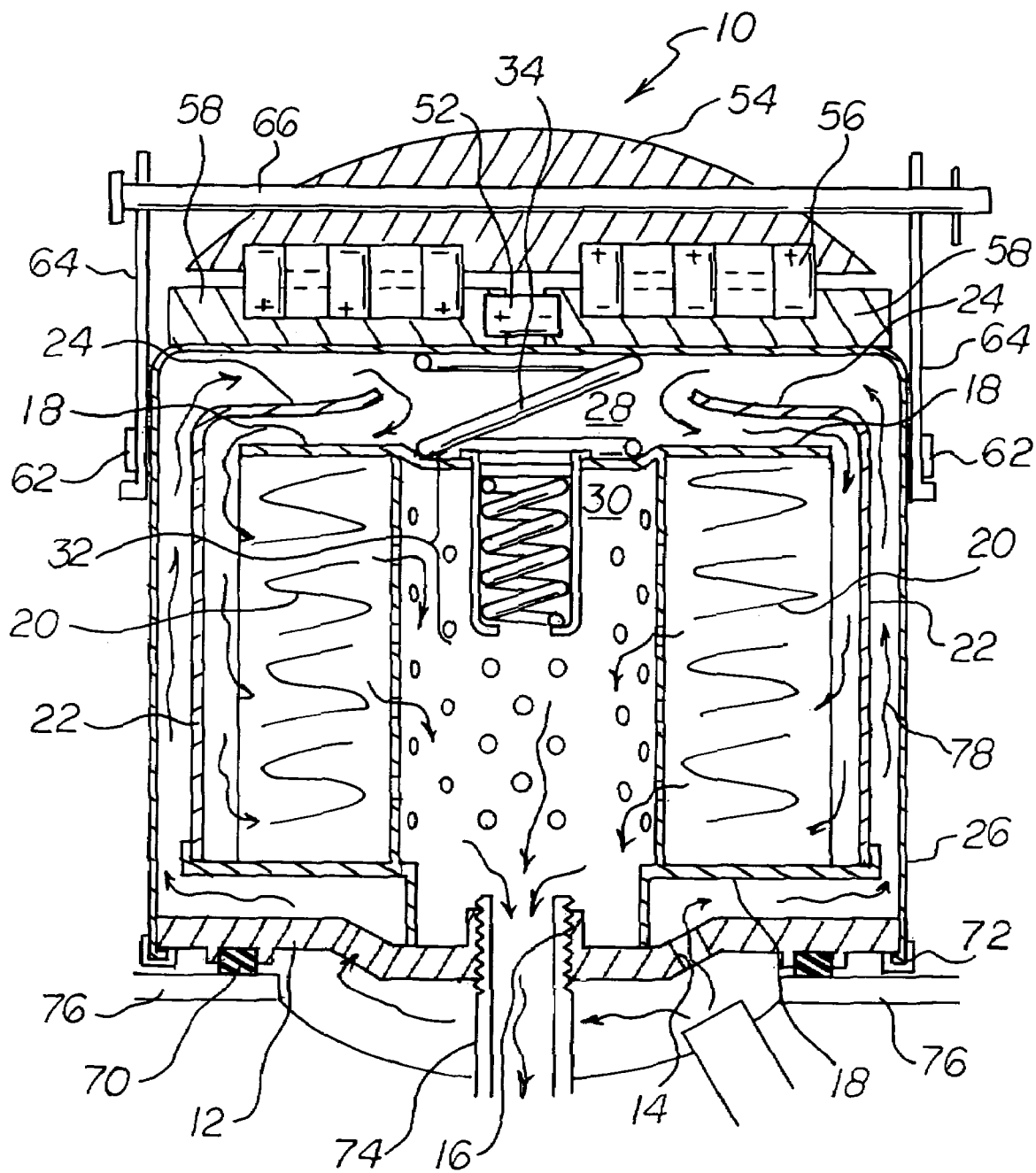
FIG. 3 is an enlarged cross-sectional view of the embodiment of the magnetically enhanced oil filter apparatus of FIG. 2 taken along line 3-3 thereof.
Figure 4:
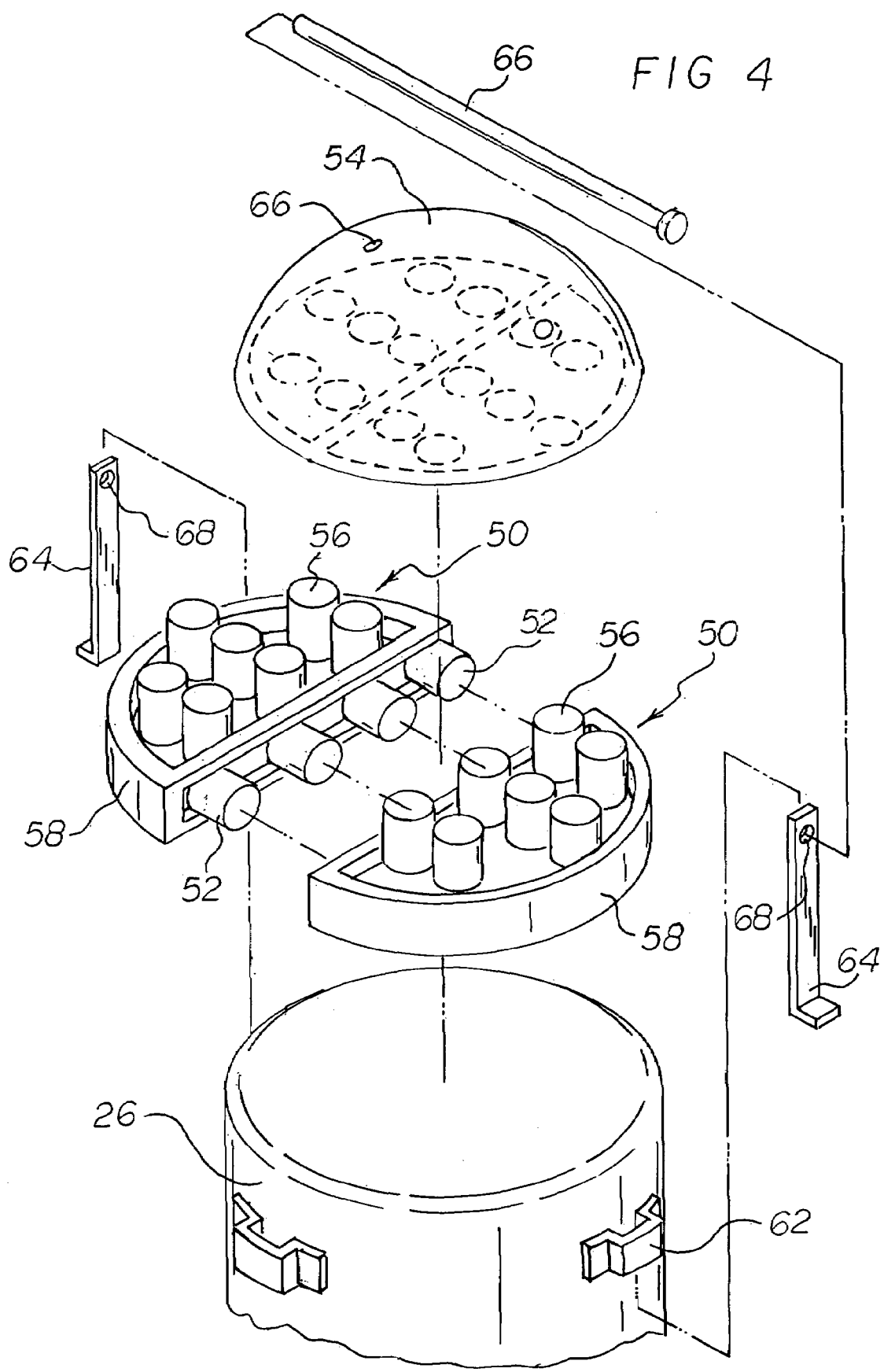
FIG. 4 is a partially exploded perspective view of a magnet assembly of the embodiment of the invention shown in FIGS. 1-3.

The top portion 24 of the flow director shroud 22 forms a flow director orifice 36. As shown in the first embodiment of the invention, the flow director orifice 36 has a flow director orifice first diameter 40 which is greater than an external diameter of the retainer spring. As a consequence, the retainer spring extends through the flow director orifice 36 and rests upon the top of the filtration material support bracket 18, as shown in FIG. 3.

As shown with the second embodiment of the invention, in FIG. 6, the flow director orifice 36 has a flow director orifice second diameter 42 which is less than the internal diameter of the retainer spring. Also, the top portion 24 of the flow director shroud 22 has an elevated ring portion 80. More specifically, the ring portion 44 of the spring 48 having radially directed leaf spring arms 46 projecting outward from the ring portion 44, has an internal diameter which is greater than the flow director orifice second diameter 42. Consequently, the ring portion 44 rests upon the elevated ring portion 80 of the flow director shroud 22 when the apparatus is assembled.

Preferably, the magnetic flux assembly includes a pair of bottom magnet units 50, wherein each bottom magnet unit 50 includes a plurality of vertically oriented, flux providing magnets 56 and includes a bottom shunt member 58 which supports the vertically oriented, flux providing magnets 56. A plurality of horizontally oriented bottom shunt magnets 52 are interconnected between the bottom shunt members 58 of the pair of bottom magnet units 50, and a dome-shaped top shunt member 54 is placed on top of the vertically oriented, flux providing magnets 56.

The assembly-to-assembly connection means can include a pin reception channel 60 in the dome-shaped top shunt member 54. Brace brackets 62 are on the exterior housing 26, and brace members 64 are interlocked with the brace brackets 62 and extend upward toward the dome-shaped top shunt member 54. A lock pin 66 is threaded through pin reception channels 68 in the brace members 64 and through the pin reception channel 60 in the dome-shaped top shunt member 54.

To assemble the oil filtration assembly, a filtration assembly base 12 is placed on a support surface. A combination filtration material support bracket 18, filtration material 20, flow director shroud 22, and blowby valve assembly 32 is placed on the filtration assembly base 12 so that the bottom of the filtration material support bracket 18 portion surrounds the oil outlet 16. Then, a retainer spring, such as spiral retainer spring 34 shown in FIG. 3, is placed on top of the filtration material support bracket 18. Then, the exterior housing 26 is lowered over the combination set forth above so that the bottom edge of the exterior housing 26 fits into a circular groove 72 located at the bottom of the filtration assembly base 12. When suitable downward pressure is applied to the top of the exterior housing 26, the bottom edge of the exterior housing 26 is deformed inside the groove 72 to form a secure liquid-tight connection. At this point, the oil filtration assembly is fully assembled.

To assemble the magnetic flux assembly, a number of vertically oriented flux providing magnets 56 are placed on the pair of bottom shunt members 58. The magnetic attraction between the vertically oriented flux providing magnets 56 and the bottom shunt members 58 keeps the vertically oriented flux providing magnets 56 in position of the bottom shunt members 58. Then, the horizontally oriented bottom shunt magnets 52 are placed against side portion of one of the bottom shunt members 58, and the two bottom shunt members 58 are brought together so that the horizontally oriented bottom shunt magnets 52 are interconnected between the bottom shunt members 58. Then, the dome-shaped top shunt member 54 is placed onto top of the vertically oriented flux providing magnets 56. Magnetic attractions between the vertically oriented flux providing magnets 56, the bottom shunt members 58, the horizontally oriented bottom shunt magnets 52, and the dome-shaped top shunt member 54 keep the magnetic flux assembly is connected together as an integrated unit.

To attach the magnetic flux assembly to the oil filtration assembly, the magnetic flux assembly is placed on top of the oil filtration assembly so that the pin reception channel 60 is in alignment with a pair of brace brackets 62. Then, vertical portions of a pair of brace members 64 are threaded though a pair of brace brackets 62, from bottom to top, so that horizontal portions of the brace members 64 engage the brace brackets 62. Then, the pin reception channels 68 of the brace members 64 and the pin reception channel 60 are in registration. Then, A lock pin 66 is threaded through the pin reception channels 68 and the pin reception channel 60. In this way, the magnetic flux assembly is attached to the oil filtration assembly. When the magnetic flux assembly is attached to the oil filtration assembly, the assembly of the magnetically enhanced oil filter apparatus 10 of the invention is completed.

To use the magnetically enhanced oil filter apparatus 10 of the invention, the oil outlet 16 is screwed onto a fitting 74 on an engine. The magnetically enhanced oil filter apparatus 10 is screwed onto the fitting 74 so that the sealing ring 70 forms an oil-tight seal with the engine block 76. When oil flows into the magnetically enhanced oil filter apparatus 10, oil passes through the oil inlets 14 and passes into the pre-filtration zone 28. Oil flows along the path shown by directional arrows 78 on the outside of the flow director shroud 22. When the oil reaches the top portion 24 of the flow director shroud 22, the oil flow is in close proximity to the top of the exterior housing 26, and, as a result, the oil is exposed to the intense magnetic flux surrounding the magnetic flux assembly adjacent to the top of the exterior housing 26. The top portion 24 of the flow director shroud 22 assures that the oil is exposed to intense attractive magnetic flux adjacent to the inside top of the exterior housing 26. In this respect, ferromagnetic particles in the oil are attracted to and adhered onto the inside top of the exterior housing 26. Then, oil having reduced ferromagnetic particle content passes between the flow director shroud 22 and the filtration material 20. Then, oil having reduced ferromagnetic particle content flows through the filtration material 20, into the post-filtration zone 30, and out from the oil outlet 16.

Figure 5:
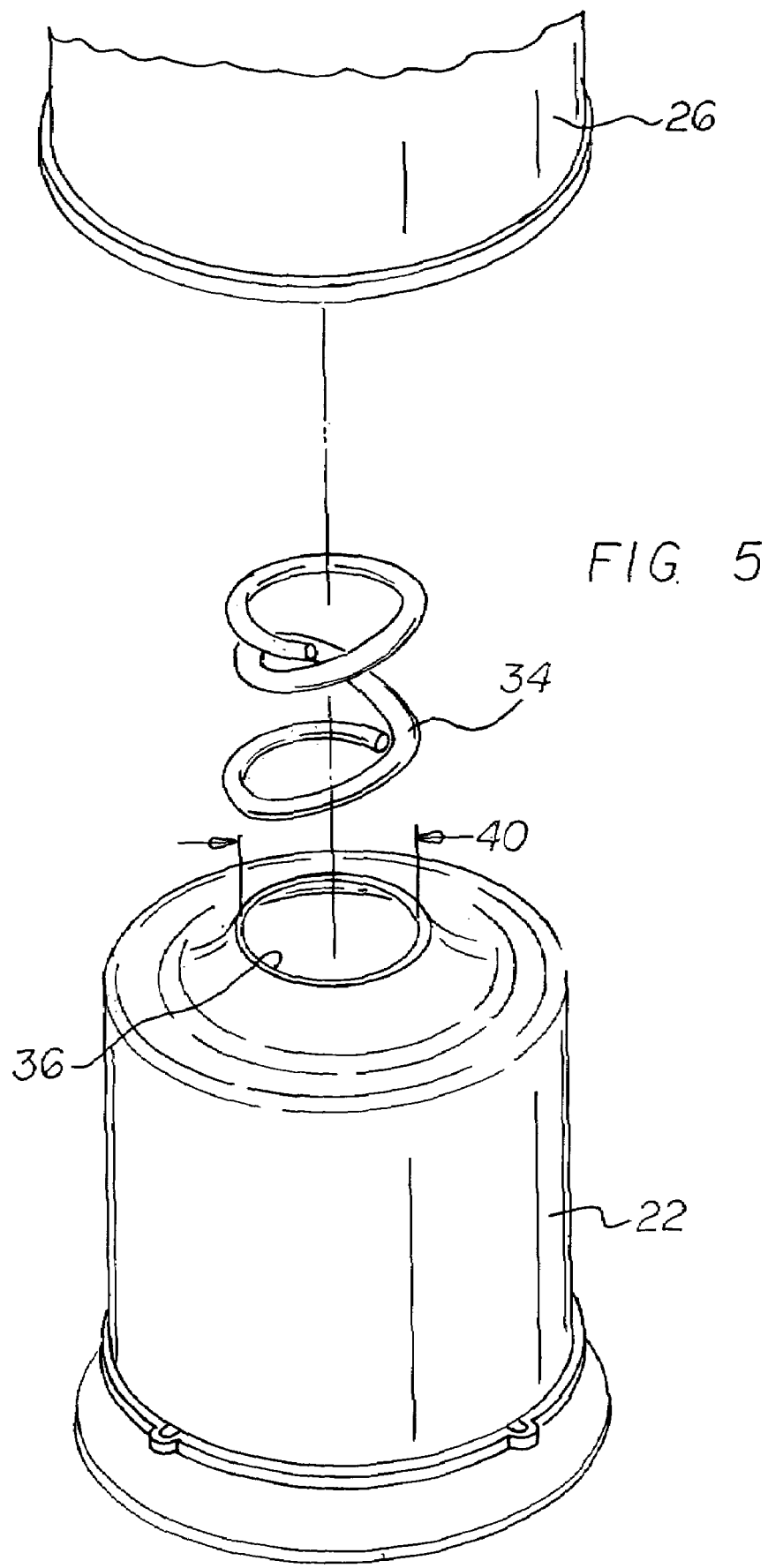
FIG. 5 is a partially exploded perspective view of the first embodiment of the invention wherein an exterior housing is shown with respect to a flow director shroud and a coil spring located between the exterior housing and the flow director shroud.

It will be appreciated that in accordance with the present invention, the top portion 24 of flow director 22 is slightly concave or curved upward as best seen in FIGS. 3, 5 and 6. This arrangement, it is theorized, produces turbulence in the flowing oil stream in the region of orifice 36 thereby exposing more oil to the proximal or most intense part of the magnetic flux field generated by the magnetic flux assembly reposing on the top of the exterior housing 26 and therefore, helps to maximize the efficiency of the magnetic filtering action afforded by the present invention.

It is noted that, under normal circumstances, the oil pressure in the pre-filtration zone 28 is less than the pressure setting on the blowby valve assembly 32. Therefore, under normal circumstances, the blowby valve assembly 32 remains closed, allowing oil to flow through the filtration material 20 and into the post-filtration zone 30.

However, in the event that the filtration material 20 becomes clogged, the oil pressure inside the pre-filtration zone 28 can build up to the pressure point which causes the blowby valve assembly 32 to open, as a result, the pressure bypasses the clogged filtration material 20 and flows from the pre-filtration zone 28, through the blowby valve assembly 32, and into the post-filtration zone 30.

In accordance with another aspect of the invention, an oil filtration assembly includes a filtration assembly base 12 having oil inlets 14 and an oil outlet 16 located in the filtration assembly base 12. An exterior housing 26 is connected to the filtration assembly base 12. The exterior housing 26 and the filtration assembly base 12 define a pre-filtration zone 28. A filtration material support bracket 18 rests on the filtration assembly base 12. The filtration assembly base 12 and the filtration material support bracket 18 define a post-filtration zone 30. A quantity of filtration material 20 is supported by the filtration material support bracket 18 and is located in the pre-filtration zone 28. A flow director shroud 22 is connected to the filtration material support bracket 18 and is located in the pre-filtration zone 28, wherein a top portion 24 of the flow director shroud 22 extends over the filtration material 20. A retainer spring is positioned between the exterior housing 26 and a top portion of the filtration material support bracket 18, for urging the filtration material support bracket 18 in firm contact with the filtration assembly base 12.

In accordance with another aspect of the invention, a magnetic flux assembly includes a pair of bottom magnet units 50, wherein each bottom magnet unit 50 includes a plurality of vertically oriented flux providing magnets 56 and a bottom shunt member 58 which supports the vertically oriented flux providing magnets 56. A plurality of horizontally oriented bottom shunt magnets 52 are interconnected between the bottom shunt members 58 of the pair of bottom magnet units 50, and a dome-shaped top shunt member 54 placed on top of the vertically oriented flux providing magnets 56.

The components of the magnetically enhanced oil filter apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved magnetically enhanced oil filter apparatus that is low in cost, relatively simple in design and operation, and which provides a magnet array that does not need both top and bottom shunt magnets. With the invention, a magnetically enhanced oil filter apparatus is provided which has a top portion of the magnet array, the portion farthest from the oil being filtered, that does not employ a horizontally oriented shunt magnet. With the invention, a magnetically enhanced oil filter apparatus is provided which does not have oil filter material obstructing the flow of oil to some portions of the apparatus which are adjacent to the magnet array. With the invention, a magnetically enhanced oil filter apparatus is provided which accommodates the presence of an internal pressure relief valve to relieve excessive internal oil pressure.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A magnetically enhanced oil filter apparatus, comprising:

an oil filtration assembly which includes a filtration assembly base, oil inlets and an oil outlet located in said filtration assembly base, an exterior housing connected to said filtration assembly base, wherein said exterior housing and said filtration assembly base define a pre-filtration zone, a filtration material support bracket resting on said filtration assembly base, wherein said filtration assembly base and said filtration material support bracket define a post-filtration zone, a quantity of filtration material supported by said filtration material support bracket and located in said pre-filtration zone, a flow director shroud connected to said filtration material support bracket and located in said pre-filtration zone, wherein a top portion of said flow director shroud extends over said filtration material, and a retainer spring, positioned between said exterior housing and a top portion of said filtration material support bracket, for urging said filtration material support bracket in firm contact with said filtration assembly base, a magnetic flux assembly resting on said oil filtration assembly, assembly-to-assembly connection means for connecting said magnetic flux assembly to said oil filtration assembly, wherein said top portion of said flow director shroud forms a flow director orifice, and wherein said flow director orifice has a flow director orifice first diameter which is greater than an external diameter of said retainer spring whereby said retainer spring is adapted to extend through said orifice between said exterior housing and a top portion of said filtration material support bracket.

2. The apparatus of claim 1 wherein said filtration material support bracket and said flow director shroud are formed as a unified, integrated structure.

3. The apparatus of claim 1, further including:
a sealing ring connected to a bottom side of said filtration assembly base.

4. The apparatus of claim 1, further including:
a blowby valve assembly connected to said filtration material support bracket for controlling oil flow between said pre-filtration zone and said post-filtration zone.

5. The apparatus of claim 1 wherein said retainer spring is in a form of a spiral retainer spring.

6. The apparatus of claim 1 wherein said magnetic flux assembly includes: a pair of bottom magnet units, wherein each bottom magnet unit includes a plurality of vertically oriented flux providing magnets and a bottom shunt member which supports said vertically oriented flux providing magnets, a plurality of horizontally oriented bottom shunt magnets interconnected between said bottom shunt members of said pair of bottom magnet units, and a dome-shaped top shunt member placed on top of said vertically oriented flux providing magnets.

7. The apparatus of claim 1 wherein said assembly-to-assembly connection means include:
a pin reception channel in said dome-shaped top shunt member,
brace brackets on said exterior housing,
brace members interlocked with said brace brackets and extending upward toward said dome-shaped top shunt member, and
a lock pin threaded through pin reception channels in said brace members and through said pin reception channel in said dome-shaped top shunt member.

8. A magnetically enhanced oil filter apparatus, comprising:

an oil filtration assembly which includes a filtration assembly base, oil inlets and an oil outlet located in said filtration assembly base, an exterior housing connected to said filtration assembly base, wherein said exterior housing and said filtration assembly base define a pre-filtration zone, a filtration material support bracket resting on said filtration assembly base, wherein said filtration assembly base and said filtration material support bracket define a post-filtration zone, a quantity of filtration material supported by said filtration material support bracket and located in said pre-filtration zone, a flow director shroud connected to said filtration material support bracket and located in said pre-filtration zone, wherein a top portion of said flow director shroud extends over said filtration material, and a retainer spring, positioned between said exterior housing and a top portion of said filtration material support bracket, for urging said filtration material support bracket in firm contact with said filtration assembly base, a magnetic flux assembly resting on said oil filtration assembly, assembly-to-assembly connection means for connecting said magnetic flux assembly to said oil filtration assembly, wherein said top portion of said flow director shroud forms a flow director orifice, and wherein said flow director orifice has a flow director orifice first diameter which is less than the internal diameter of said retainer spring whereby said retainer spring is adapted to extend between said exterior housing and said top portion of said flow director shroud.

9. The apparatus of claim 8 wherein said retainer spring is in a form of a spring having an inner ring portion and having radially directed leaf spring arms extending outward from said ring portion.

10. The apparatus of claim 8 wherein said magnetic flux assembly includes: a pair of bottom magnet units, wherein each bottom magnet unit includes a plurality of vertically oriented flux providing magnets and a bottom shunt member which supports said vertically oriented flux providing magnets, a plurality of horizontally oriented bottom shunt magnets interconnected between said bottom shunt members of said pair of bottom magnet units, and a dome-shaped top shunt member placed on top of said vertically oriented flux providing magnets.

11. The apparatus of claim 10 wherein said assembly-to-assembly connection means include:
a pin reception channel in said dome-shaped top shunt member,
brace brackets on said exterior housing,
brace members interlocked with said brace brackets and extending upward toward said dome-shaped top shunt member, and
a lock pin threaded through pin reception channels in said brace members and through said pin reception channel in said dome-shaped top shunt member.

12. The apparatus of claim 8 wherein said filtration material support bracket and said flow director shroud are formed as a unified, integrated structure.

13. The apparatus of claim 8, further including:
a sealing ring connected to a bottom side of said filtration assembly base.

14. The apparatus of claim 8, further including:
a blowby valve assembly connected to said filtration material support bracket for controlling oil flow between said pre-filtration zone and said post-filtration zone.

* * * * *